United States Patent [19]
Alexander

[11] Patent Number: 6,035,475
[45] Date of Patent: Mar. 14, 2000

[54] MAINTENANCE PROP FOR A DOCK LEVELER

[75] Inventor: James C. Alexander, Ontario, Canada

[73] Assignee: United Dominion Ind., Inc., Charlotte, N.C.

[21] Appl. No.: 09/035,036

[22] Filed: Mar. 5, 1998

[51] Int. Cl.[7] .................................................. E01D 1/00
[52] U.S. Cl. ............................................ 14/71.1; 14/69.5
[58] Field of Search .................................. 14/71.1, 71.3, 14/71.7, 69.5; 108/35, 56.1, 56.3, 169, 127, 131, 132, 160, 147.19, 147.21

[56] References Cited

U.S. PATENT DOCUMENTS

| | | | |
|---|---|---|---|
| 242,804 | 6/1881 | Vanstone | 108/132 |
| 761,468 | 5/1904 | Ford | 108/147.21 |
| 1,203,783 | 11/1916 | Reischmann | 108/132 |
| 4,619,008 | 10/1986 | Kovach et al. | 14/71.7 |

*Primary Examiner*—Eileen Dunn Lillis
*Assistant Examiner*—Kristine M. Markovich
*Attorney, Agent, or Firm*—Sughrue, Mion, Zinn, Macpeak & Seas, PLLC

[57] ABSTRACT

A dockboard, such as a pit type comprising a frame, a deck attached to the frame at one end thereof, a lip hinged to another end of the deck for movement between a pendant position and an outward extended position. A maintenance assembly for the dockboard has a pivotable prop mounted to the underside of the deck for movement between a stored position generally parallel to the deck and a downward extended position supporting the deck. A locking member secures the prop in both the stored and the extended position. The lip may be supported by the maintenance assembly using a spring member to support the lip support bar, or move a member into engagement thereby preventing the lip from falling.

20 Claims, 6 Drawing Sheets

MAINTENANCE PROP FOR A DOCK LEVELER

BACKGROUND OF THE INVENTION

1. Field of the Invention

This invention relates to a loading dock and a maintenance prop for a dock leveler. A dock leveler is used to bridge the distance between the floor of a building and the bed of a truck. A typical dock leveler has a stationary frame, a deck hinged at the rear to the frame, and a deck extension or lip hinged to the front of the deck. A dock leveler may have various means to raise the deck and extend the lip, including hydraulic, electric or mechanical. Usually the operating means is located under the deck which must be raised to allow access for periodic maintenance. To ensure the safety of the maintenance workers, a maintenance prop is usually provided to support the deck in the raised position.

2. Prior Art

The maintenance prop is usually a bar or tube which is placed with the lower end resting on the frame of the dock leveler or on the floor of the pit, and the upper end under the deck or the lip. The prop may be separate from the dock leveler, attached by a chain to prevent misplacing it, or attached by a hinge to the deck or the frame so that it may be rotated between a stored and an engaged position. The primary purpose of the maintenance prop is to ensure that the deck is not accidentally lowered while someone is working under it. It may also be desirable to have a means of locking the prop in the engaged position to prevent the leveler from being used until maintenance has been completed.

Some dock levelers have a maintenance prop which supports the lip in the extended position. An example which supports the lip is illustrated in U.S. Pat. No. 4,376,319. Others support only the deck and allow the lip to be extended or retracted in the maintenance position. Some dock levelers have an independent support for the lip. The lip support shown in U.S. Pat. No. 4,376,319 is manually engaged and automatically retracts when the weight of the lip is removed from it. Unless the operator inserts the safety pin in the lip support bar, it will automatic disengage if the lip is momentarily raised from the maintenance prop.

Another example of a maintenance strut that supports the lip is found in U.S. Pat. No. 5,546,623. This device comprises a removable strut that is positioned by a base member and a hole in the lip. The strut protrudes through the lip and is pinned in place, top and bottom. A support block, mounted on the strut, rests under the lip and positions the deck at the proper height for working under the deck.

SUMMARY OF THE INVENTION

This invention is a maintenance prop which is attached to the underside of the deck of a dock leveler. It can be easily engaged using only one hand and automatically falls to the engaged position when released from the stored position. Because it supports only the deck, the prop can be engaged whether the lip is retracted or extended. Moving the maintenance prop to the engaged position activates a lip support bar which automatically supports the lip when the lip is extended. The operator can manually disengage the lip support to retract the lip during maintenance, but it will automatically re-engage when the lip is extended thus preventing the lip from accidentally falling. When the maintenance prop is moved to the stored position, the lip will remain supported in the extended position until the weight of the lip is removed from the lip support.

To ensure safety of the maintenance worker, the maintenance prop should not be dislodged when accidentally pushed, or when the deck is raised higher while in the maintenance position. One embodiment of the invention has the maintenance prop hinged from the under side of the deck and has a pin to secure the prop in both the stored and engaged positions. When engaged, the prop is secured in a fixed position relative to the deck so that it cannot be accidentally displaced and the bottom end will always engage the floor of the pit to support the deck. A second embodiment of the invention has a spring which automatically latches the maintenance prop in either the stored or engaged position. This allows the prop to be easily operated with one hand. A third embodiment of the invention has a telescopic maintenance prop to allow the lower portion to be fixed to a support structure such as the frame of the leveler. This allows the maintenance prop to remain engaged even if the deck is raised higher and ensures proper support of the bottom of the maintenance prop if the pit floor is not suitable such as when the leveler is installed in a deep pit or on a free standing frame. A spring clamp on the deck supports the prop in the stored position and also allows it to be easily operated with one hand.

DESCRIPTION OF THE PREFERRED EMBODIMENTS

Figure 1:
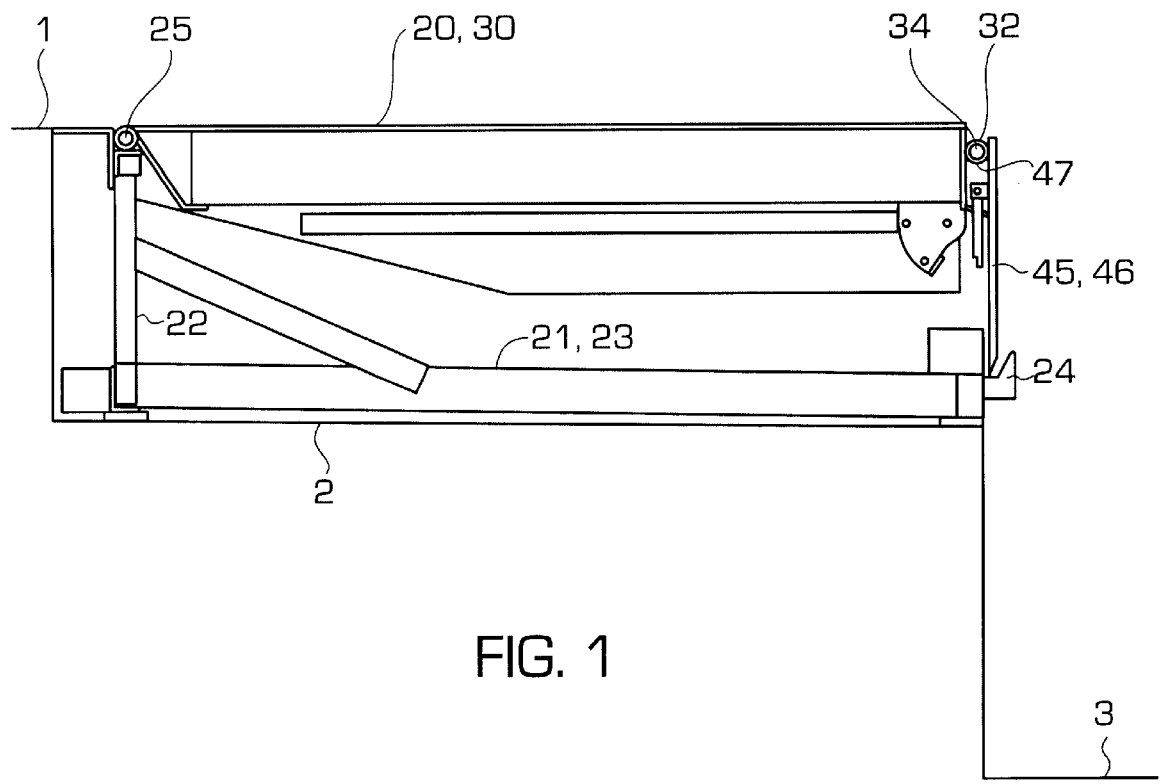
FIG. 1 is a cut away side view of a typical pit style dock leveler stored at dock level showing the basic components and the maintenance prop in accordance with a first preferred embodiment of this invention.
Figure 3:
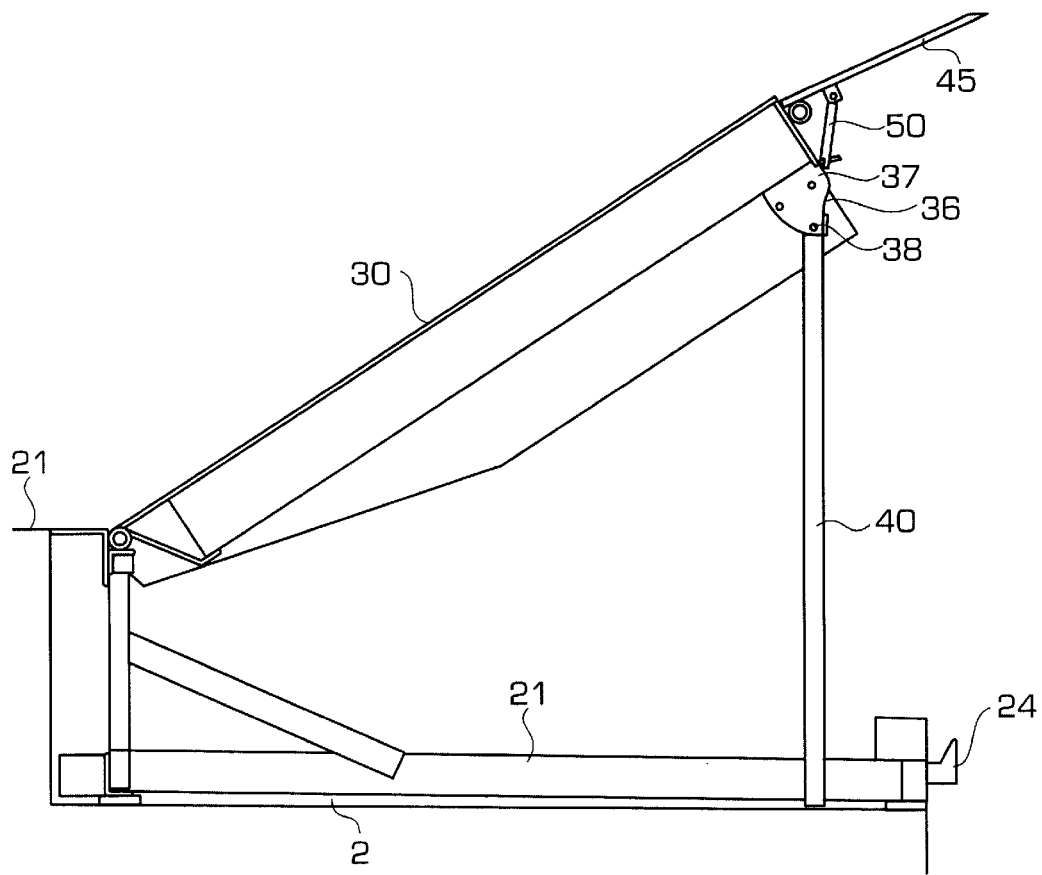
FIG. 3 is a cut away side view of the dock leveler with the deck raised and lip extended illustrating the maintenance prop engaged.
Figure 4:
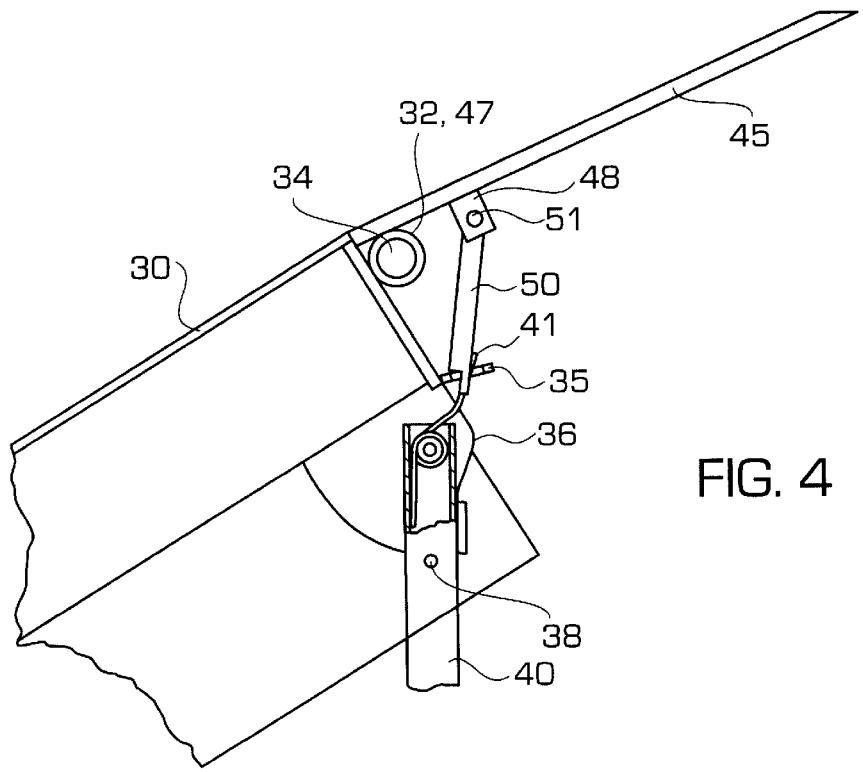
FIG. 4 is a partial side view similar to FIG. 3 illustrating the maintenance prop and the lip support components in greater detail.

Referring now to FIG. 1 a first preferred embodiment is illustrated. A loading dock has a dock floor 1, a recessed pit 2 and a driveway 3. A dock leveler 20 has a frame assembly 21 which is installed in the pit 2. The frame assembly has vertical back frame members 22 and horizontal frame members 23 which extend forward to the front of the pit and carry lip keepers 24. A deck assembly 30 is attached to the top of the frame members 22 by a hinge pin 25. The front of the deck assembly has hinge tubes 32. A lip assembly 45 has a lip plate 46 and hinge tubes 47 and is attached to the deck assembly by a hinge pin 34. The operating mechanism for the deck and the lip is not illustrated but may be hydraulic, electric or mechanical. As illustrated more clearly in FIG. 2, the lip assembly 45 has a pair of brackets 48 which carry a lip support bar 50 on a pin 51. The deck assembly 30 has a slotted latch bracket 35 which guides the lip support bar 50. The deck assembly 30 also has a bracket 36 and pin 37 which carry a maintenance prop 40. A spring 41 is also carried by the pin 37. A security pin 38 holds the maintenance prop 40 in the stored position and may also be used to secure the prop in the engaged position as illustrated in FIGS. 3 and 4. When the pin 38 is removed, the maintenance prop falls to the engaged position where it can be secured by the pin 47 as shown in FIG. 3. The pin 38 may also have a hole in the end which can be used to lock the pin through the prop 40 in either the stored or engaged position.

Figure 2:
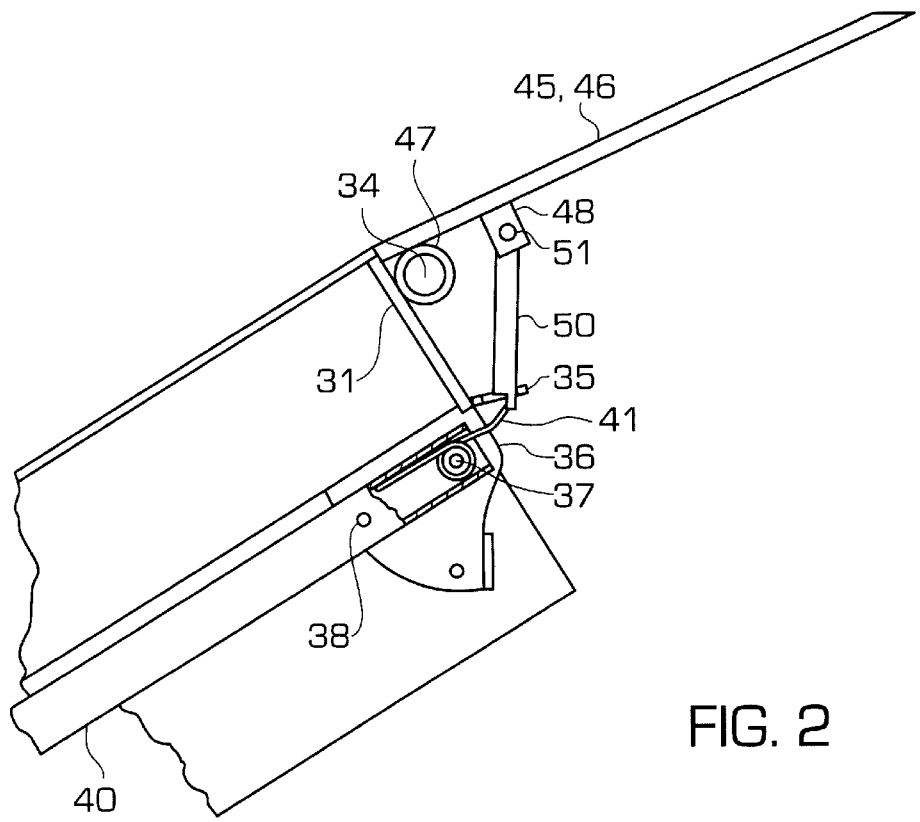
FIG. 2 is a partial side view of the dock leveler with the deck raised and the lip extended illustrating the components of FIG. 1 in greater detail.

FIG. 2 illustrates the dock leveler with the deck assembly 30 raised and the lip assembly 45 extended. The maintenance prop 40 is held in the stored position by the security pin 38. The outer end of the spring 41 is resting on the top of the latch bracket 35 and the lip support bar 50 is free to fall counter clockwise and not engage the latch bracket 35. When the maintenance prop 40 falls to the engaged position as illustrated in FIGS. 3 and 4, the spring 41 to rotates counter clockwise. The outer end of the spring engages the front of the lip support bar 50, causing it to rotate clockwise. The lip assembly 45 will be prevented from falling when lower end of the lip support bar 50 engages the latch bracket 35. The lip support bar 50 may be secured in the latched position by placing a padlock through the slot in the latch bracket 35 in front of the lip support bar. When the maintenance prop 40 is secured in the engaged position with the pin 38, the deck 30 will be safely supported in the raised position.

Figure 5:
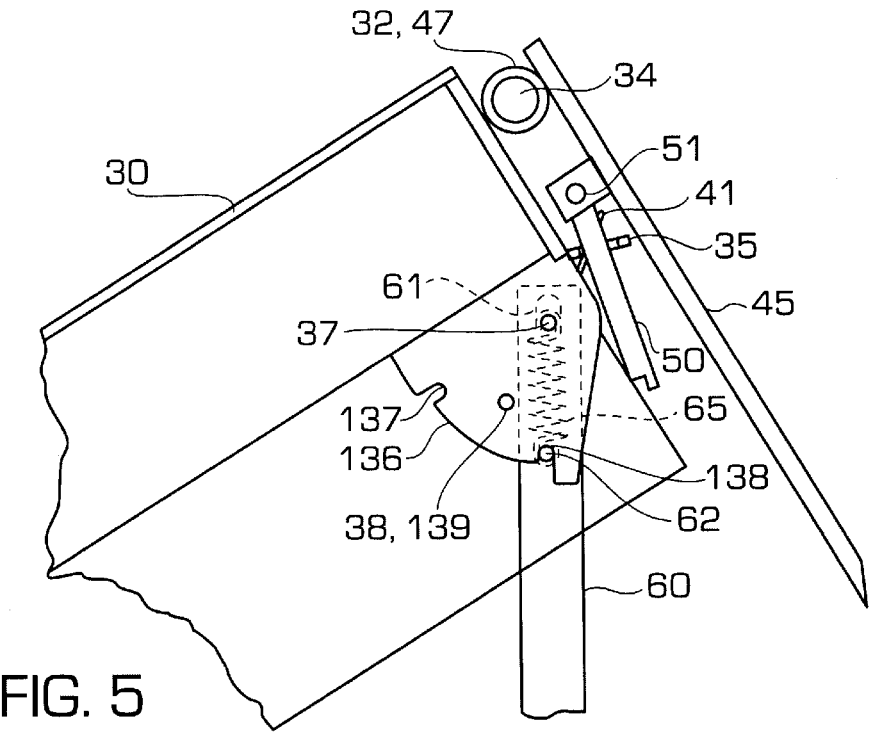
FIG. 5 is a partial cut away side view illustrating a maintenance prop with automatic latching, and with the lip in the retracted position.

Referring now to FIG. 5 a second preferred embodiment is illustrated. In this preferred embodiment a maintenance prop 60 is automatically latched in the stored or engaged position. The deck assembly 30 has a bracket 136 which has two slotted detents 137 and 138, a hole 139 and carries the maintenance prop on a pin 37. The tubular prop 60 has a slotted hole 61 and a fixed pin 62. A spring 65 has the upper end hooked over the pin 37 and the lower end hook over the pin 62 and urges the pin 62 into engagement with the detents 137 or 138 to latch the prop in the stored or engaged position. The prop can be secured in the engaged position by inserting a security pin 38 through the hole 139.

FIG. 5 illustrates the deck assembly 30 raised with the maintenance prop engaged when the lip assembly 45 has not been extended. The spring 41 is urging the lip support bar 50 to rotate clockwise so that it will engage the latch bracket 35 as soon as the lip is extended. This configuration also allows a maintenance person to lower the lip from the extended position by pulling the latch bar 50 forward out of engagement with the latch bracket 35. If the lip is extended again, it will be automatically supported.

The maintenance prop 60 can be released from the engaged position by pulling down to overcome the force of the spring 65 to disengage the pin 62 from the detent slot 138. When the prop is rotated to the stored position, the spring 65 will cause the pin 62 to engage the slot 137 and prevent the prop from falling.

Figure 6:
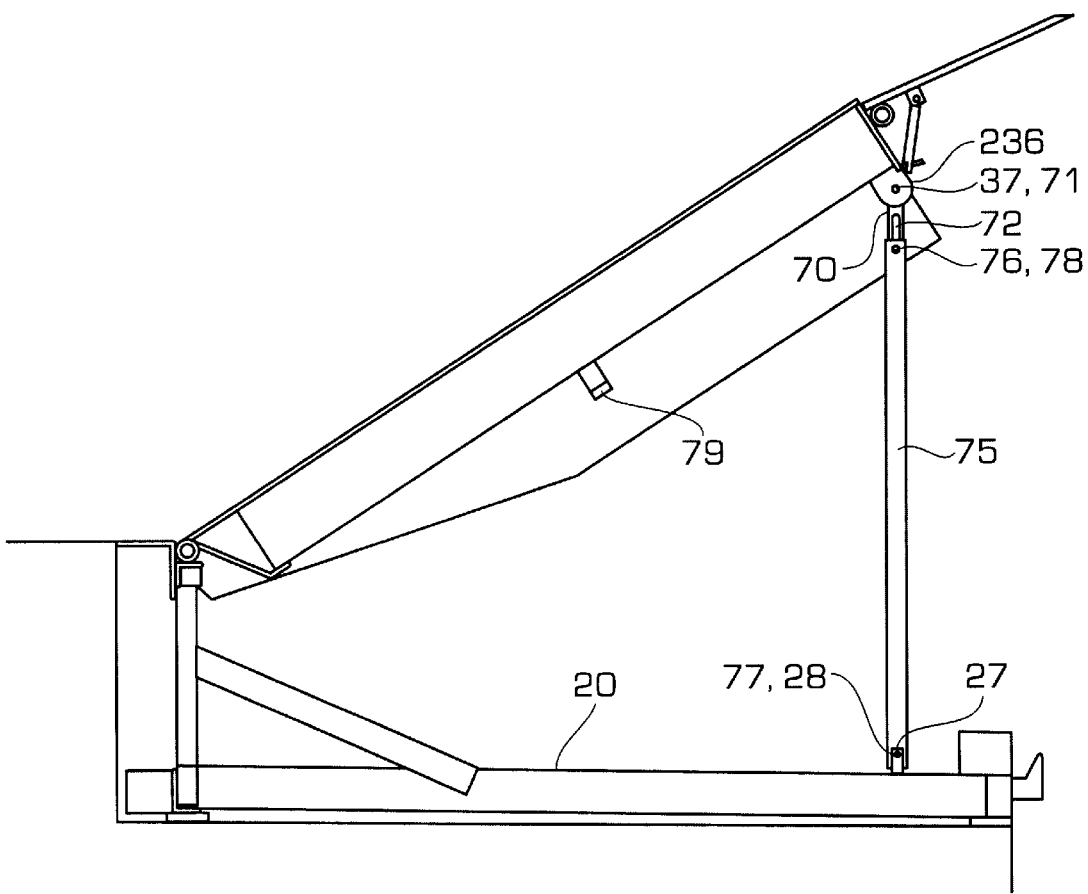
FIG. 6 is a side view illustrating a telescopic maintenance prop in the engaged position as a second embodiment of a maintenance prop.

FIG. 6 illustrates a second embodiment of a maintenance prop in accordance with this invention. A telescopic maintenance prop comprises an upper bar 70 with a pivot hole 71 and an elongated slot 72, and a lower tube 75 with two holes 76 and 77. The bar 70 and the tube 75 are attached by a pin 78 through the hole 76 and the slot 72. The device has telescoping movement by pin 76 riding in the slot. The deck assembly 30 has a bracket 236 which carries the upper bar 70 on a pin 37. The dock leveler frame assembly 21 has a bracket 27. The tube 75 can be attached to the frame assembly 21 by a pin 28. The prop is held in the stored position by a spring clamp 79 attached to the bottom of the deck assembly 30.

When the prop is rotated to the engaged position as shown, the bottom of the tube 75 can be attached to the bracket 27 by inserting the pin 28 through the hole 77 in the tube 75. The telescopic motion of the tube 75 allows the hole 77 to be easily aligned with the bracket 26 if the vertical position of the deck 30 varies. This method is effective when the dock leveler is not mounted in a pit and there is not surface suitable to support the bottom of the maintenance post 40 as shown in the first embodiment. A hole through the end of the pin 28 allows the pin to be locked in place, thus locking the prop in the engaged position.

Figure 7:
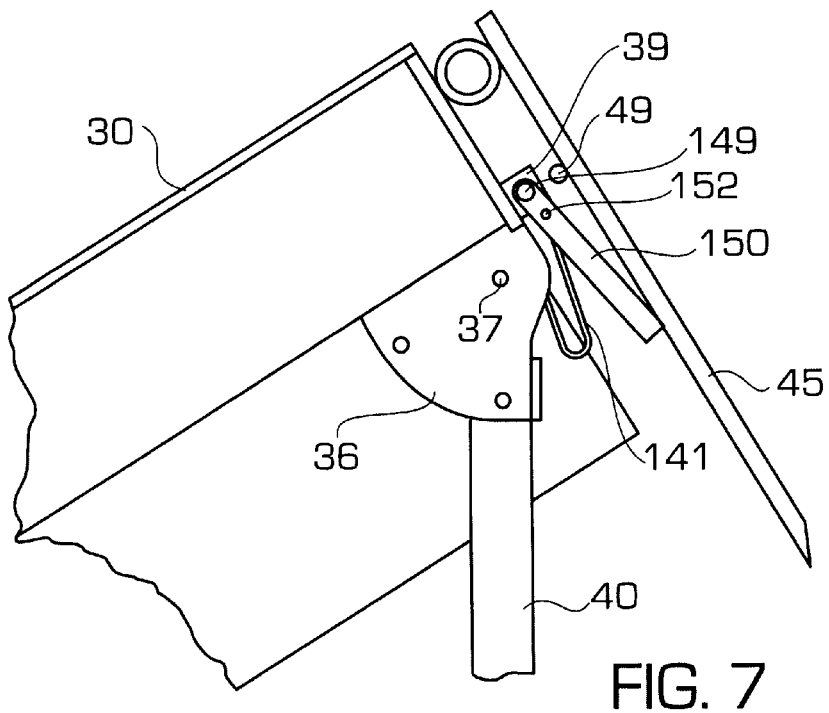
FIG. 7 is a partial side view illustrating a second embodiment of the lip support bar with the prop in the operative position and the lip retracted.
Figure 8:
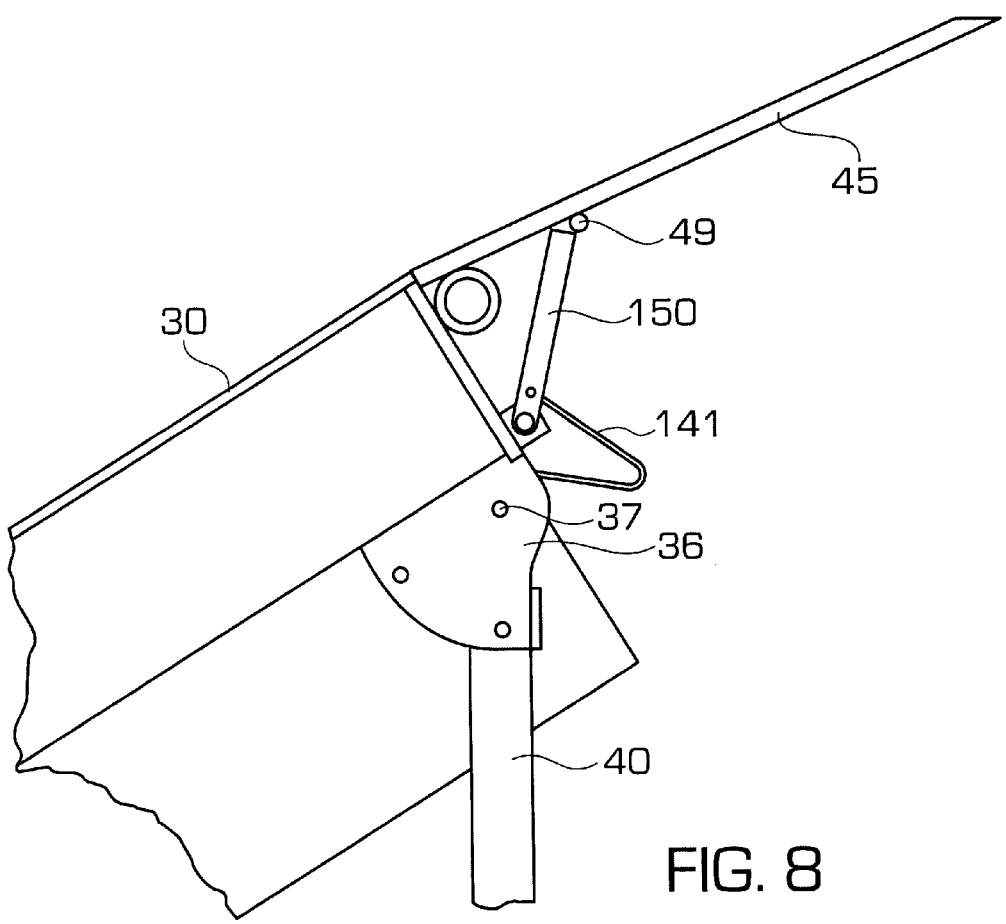
FIG. 8 is a partial side view illustrating the second embodiment of the lip support bar with the prop in the operative position and the lip extended.

FIGS. 7 and 8 illustrate a second technique of supporting the lip assembly 45 in the extended position as a variation of the first embodiment of this invention. In these figures the prop 40 is illustrated in the extended position. Two brackets 39 are attached to the front of the deck 30 and carry a lip support bar 150 on a pin 149. A latch lug 49 is attached to the lip assembly 45 to engage the end of the lip support bar 150. A spring 141 is mounted on the pin 37 and engages a pin 152 on the bar 150, urging the bar counter clockwise into engagement with the lip and latch lug 49.

Figure 9:
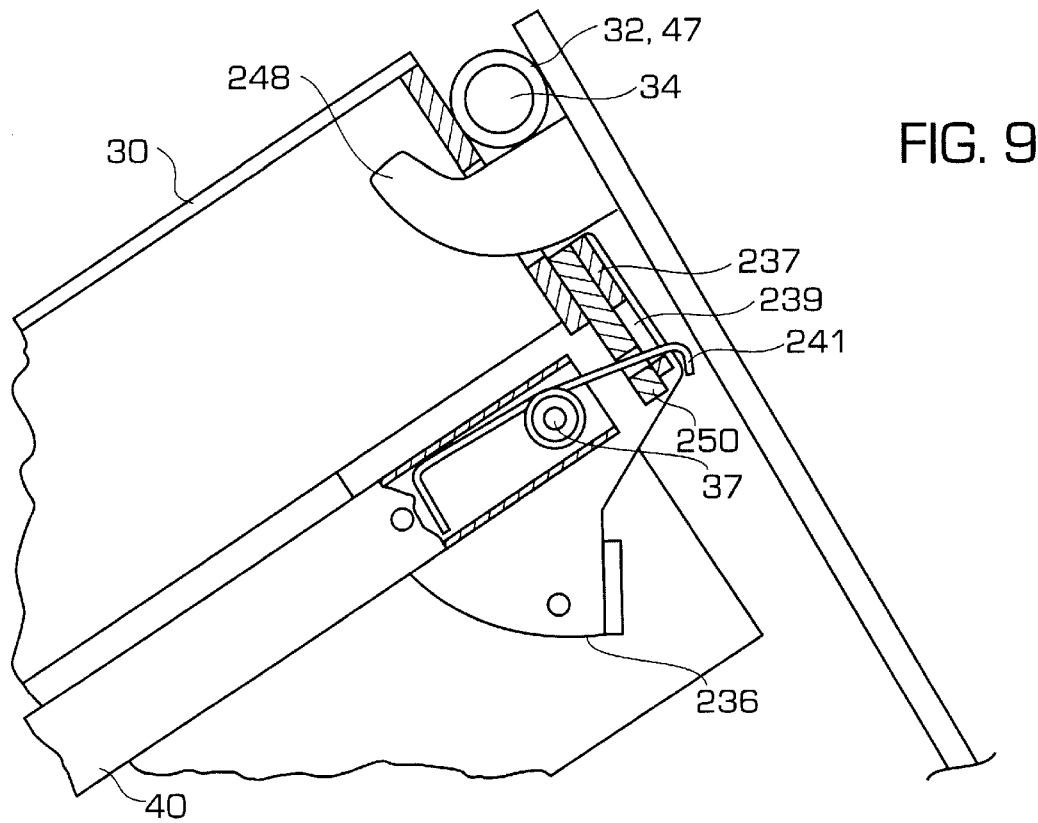
FIG. 9 is a partial side view illustrating a maintenance prop in the stored position and the lip in the retracted position, in accordance with a third embodiment of automatic latching of the lip.
Figure 10:
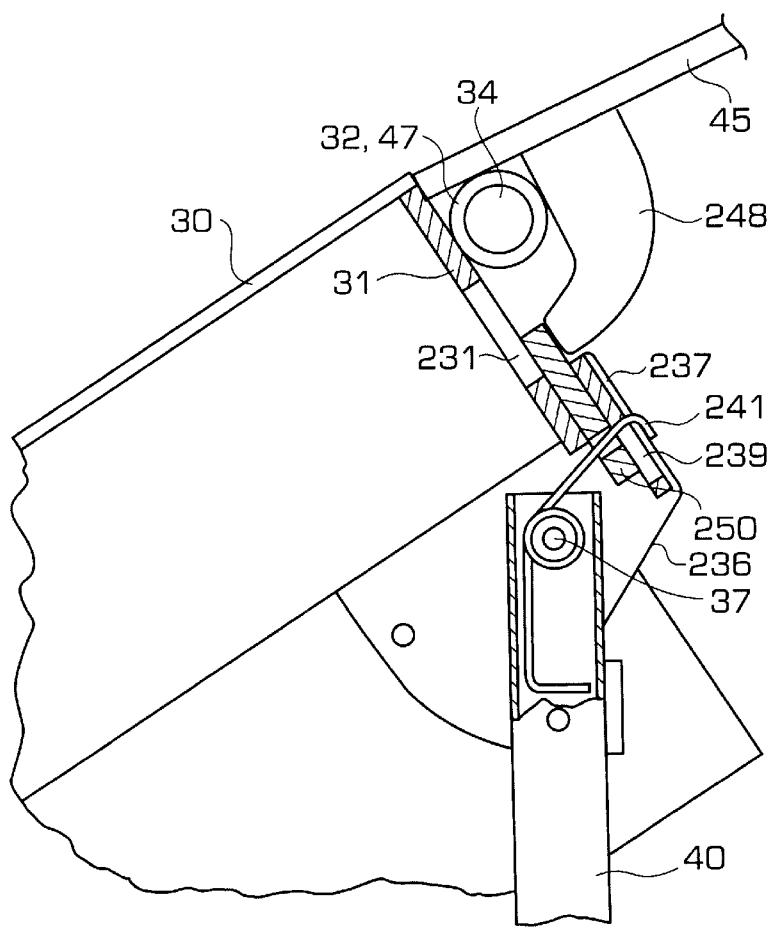
FIG. 10 is a partial side view illustrating the third embodiment of automatic latching of the lip, with the maintenance prop and the lip latch in the engaged position.

FIGS. 9 and 10 illustrate a third technique of supporting the lip assembly 45 in the extended position. The lip assembly 45 has a latch bracket 248 which passes through the front header bar 31 when the lip is retracted. The maintenance prop 40 has the same configuration as the first embodiment and is carried by a pin 37 which carries a spring 241. Two plates 236 are attached to the front of the deck 30 and carry a guide plate 237 which has an elongated hole 239. A latch bar 250 is held in the cavity formed by the front header bar 31, the plates 236 and the plate 237, and is free to move axially. The latch bar 250 is retained in the cavity by one end of the spring 241 which passes through a hole in the latch bar and the slot in the guide plate 237. The spring 241 is configured to have a bent terminal portion within tube 40 to minimize lost motion. At the other end of the spring 241 there is a bent portion to facilitate manually depressing the spring.

When the prop 40 is rotated to the stored position under the deck 30, the spring 241 will rotate clockwise with it and retract away so that it does not bias the latch bar 150 upward against the lip 45. When engaged, the lip latch 150 will rotate to the to the locked position when the lip is extended as a function of leveler actuation. There will be sufficient over travel of the lip to allow the latch to move past the lug 49. As in the other embodiments the lip latch is activated by engagement of the prop but the lip 45 is held extended until it is lifted from the latch.

As illustrated in FIGS. 9 and 10 when the maintenance prop is moved to the engaged position, the spring 241 urges the latch bar 250 to raise up in front of the hole 231 in the front header bar 31. When the lip moves toward the retracted position, the end of the latch bracket 248 will rest on the latch bar 250 and support the lip 45 in the extended position. The lip may be manually retracted by lifting the weight of the lip off the latch bar 250 and moving the end of the spring 241 down to retract the latch bar 250. When the prop is rotated to the retracted position, the spring 241 urges the latch bar to lower. However, the latch bar 250 will remain in the raised position until the weight of the lip is removed from the latch bracket 248.

Figure 11:
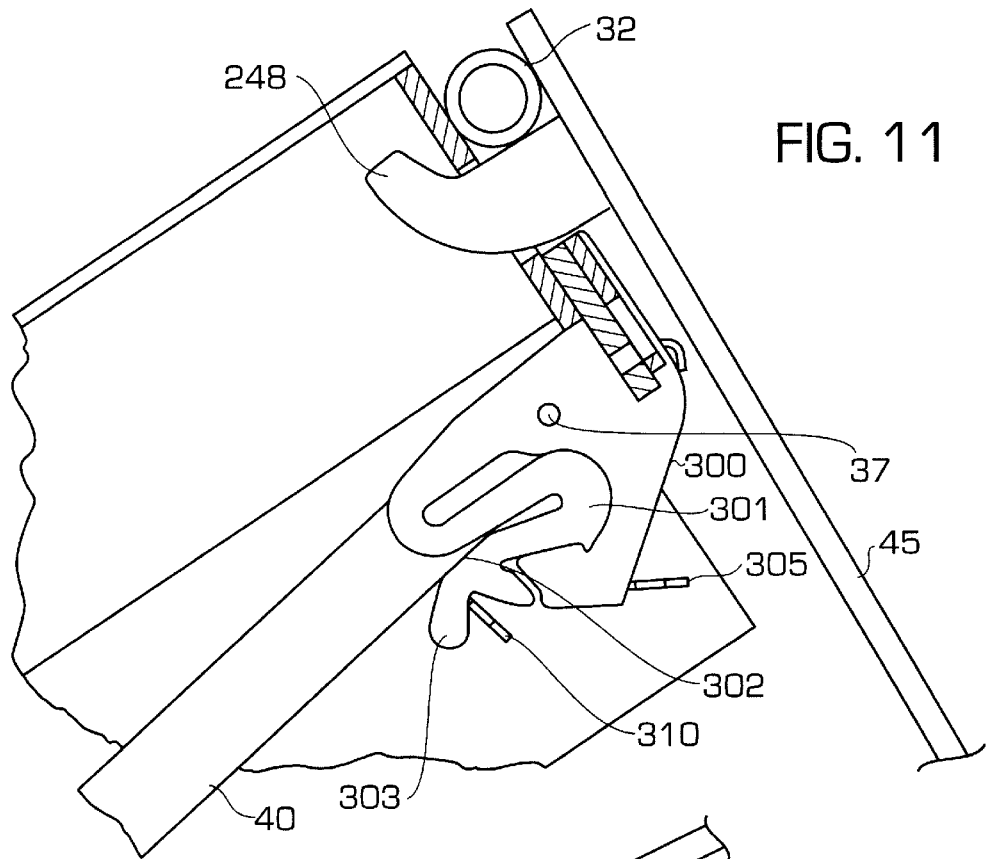
FIG. 11 is a partial side view illustrating a maintenance prop in the stored position and the lip in the retracted position and latched in place as a modification of the third embodiment of automatic latching of the lip.
Figure 12:
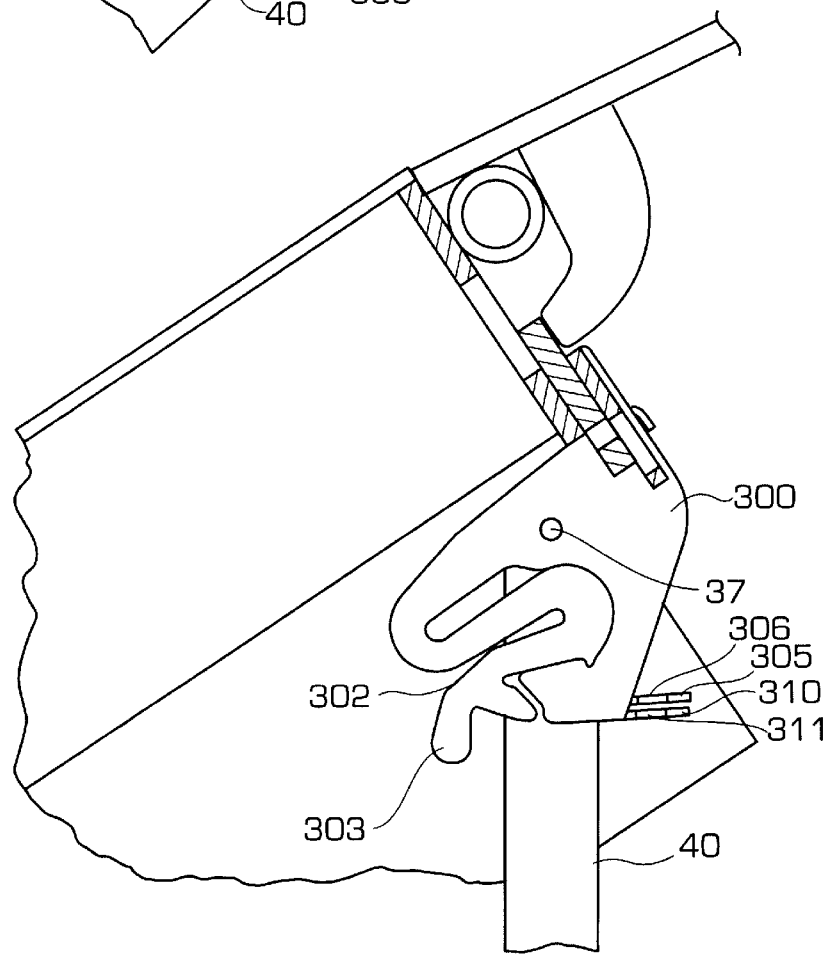
FIG. 12 is a partial side view illustrating the modified third embodiment of automatic latching of the lip, with the maintenance prop and the lip latch in the engaged position and locked in place.

Referring now to FIGS. 11 and 12 a modification of the device illustrated in FIGS. 9 and 10 is depicted. The prop and lip latch mechanism is identical to that in FIGS. 9 and 10. One side bracket 236 is replaced by a plate 300 which has a serpentine flat spring 301 cut into it. This can be done by any convenient technique such as laser cutting the metal to the desired profile. The flat spring is slightly bent so that surface 302 is placed under the prop 40 in the stored position. See FIG. 11. The narrow kerf created during cutting allows the convoluted spring 301 to move freely yet be well supported vertically by the fixed portion of plate 300 to support the prop 40.

The prop is manually released from the position in FIG. 11 to fall into the engaged position by deflecting the spring using surface 303 to separate surface 302 from under the prop 40. The engaged position is illustrated in FIG. 12. A plate 305 has a hole 306 and is attached to both plates 236 and 300. A compatible plate 310 having a hole 311 is attached to the prop 40. When in the engaged position of FIG. 12 the holes 306 and 311 are aligned permitting a lock to be inserted. This prevents the prop from moving and secures the dock leveler in the proper elevated position for maintenance.

It is apparent that other modifications of this invention are possible without departing from the essential scope of the invention.

I claim:

1. A dockboard comprising:
   a deck and a lip hinged to one end of the deck for movement between a pendant position and an outward extended position,
   a maintenance assembly comprising a prop mounted to said deck for movement between a stored position under said deck and a downward extended position,
   a locking member to secure said prop in both the stored and the extended position, and
   means to support said lip in the outward extended position when said prop is in the downward position.

2. The dockboard of claim 1 further comprising a bracket mounted to said deck, a pin securing said prop to said bracket for pivotal movement between said stored and said extended position, said bracket having plural locking points and wherein said locking member comprises a removable pin selectively insertable into said locking points to secure said prop in either said stored or said extended position.

3. The dockboard of claim 1 further comprising a bracket mounted to said deck, a pin securing said prop to said bracket for pivotal movement between said stored and said extended position, said bracket having plural locking points and wherein said locking member comprises a pin carried by said prop and selectively insertable into said locking points to secure said prop in either said stored or said extended position.

4. The dockboard of claim 3 further comprising a spring carried by said prop to bias said prop into engagement with said locking points.

5. The dockboard of claim 1 wherein said prop further comprises a pair of members extensible to adjust the length of said prop.

6. The dockboard of claim 1 further comprising a lip support bar carried by said lip, wherein said means to support said lip comprises a spring movable with said prop, said spring having an end engaging said lip support bar when said prop is in the downward extended position to prevent said lip from falling.

7. The dockboard of claim 6 wherein said dockboard further comprises a bracket mounted at the end of the deck, a slot in said bracket through which said lip support bar moves and said end of said spring engaging the lip support bar also passes through said slot to engage said lip support bar.

8. The dockboard of claim 6 wherein said spring has another end mounted to said prop.

9. The dockboard of claim 6 further comprising a lip support member carried by said lip, a bracket mounted at the end of the deck, a slot in said bracket through which said lip support bar moves, a member movable in response to movement of said prop to block at least a portion of said slot and prevent engagement of said lip support member and an end of said spring engaging the member to move it engage said lip support bar thereby supporting the lip as said prop is moved into said downward extended position.

10. A pit type dockboard comprising:
   a frame,
   a deck attached to said frame at one end thereof for pivotal movement between a generally horizontal stored position and an upward operative position,
   a lip hinged to another end of the deck for movement between a pendant position and an outward extended position,
   a maintenance assembly comprising a pivotable prop mounted to the underside of said deck for movement between a stored position generally parallel to said deck and a downward extended position supporting said deck, said prop having a length to support said deck in said upward operative position of said deck,
   a locking member to secure said prop in both the stored and the extended position, and
   means to support said lip, said lip in the outward position when said prop is in the downward position.

11. The dockboard of claim 10 further comprising a bracket mounted to said deck, a pin securing said prop to said bracket for pivotal movement between said stored and said extended position, said bracket having plural locking points and wherein said locking member comprises a removable pin selectively insertable into said locking points to secure said prop in either said stored or said extended position.

12. The dockboard of claim 10 further comprising a bracket mounted to said deck, a pin securing said prop to said bracket for pivotal movement between said stored and said extended position, said bracket having plural locking points and wherein said locking member comprises a pin carried by said prop and selectively insertable into said locking points to secure said prop in either said stored or said extended position.

13. The dockboard of claim 12 further comprising a spring carried by said prop to bias said bias into engagement with said locking points.

14. The dockboard of claim 10 wherein said prop further comprises a pair of members extensible to adjust the length of said prop.

15. The dockboard of claim 10 further comprising a lip support bar carried by said lip, wherein said means to support said lip comprises a spring movable with said prop, said spring having an end engaging said lip support bar when said prop is in the downward extended position to prevent said lip from falling.

16. The dockboard of claim 15 wherein said dockboard further comprises a bracket mounted at the end of the deck, a slot in said bracket through which said lip support bar moves and said end of said spring engaging the lip support bar also passes through said slot to engage said lip support bar.

17. The dockboard of claim 15 wherein said spring has another end mounted to said prop.

18. The dockboard of claim 15 further comprising a lip support member carried by said lip, a bracket mounted at the end of the deck, a slot in said bracket through which said lip support bar moves, a member movable in response to movement of said prop to block at least a portion of said slot and prevent engagement of said lip support member and an end of said spring engaging the member to move it engage said lip support bar thereby supporting the lip as said prop is moved into said downward extended position.

19. The dockboard of claim 10 wherein said locking member comprises a spring plate carried by said deck to hold said prop in said stored position and first locking element carried by said prop and movable into position with a second locking element to prevent retraction of said prop.

20. The dockboard of claim 19 wherein said spring plate comprises a deflectable portion contacting said prop in the stored position and manually movable to permit said prop to fall into said extended position.

* * * * *